Jan. 22, 1946. J. M. HAIT 2,393,369
RESILIENT AXLE SUPPORT
Filed Jan. 8, 1942
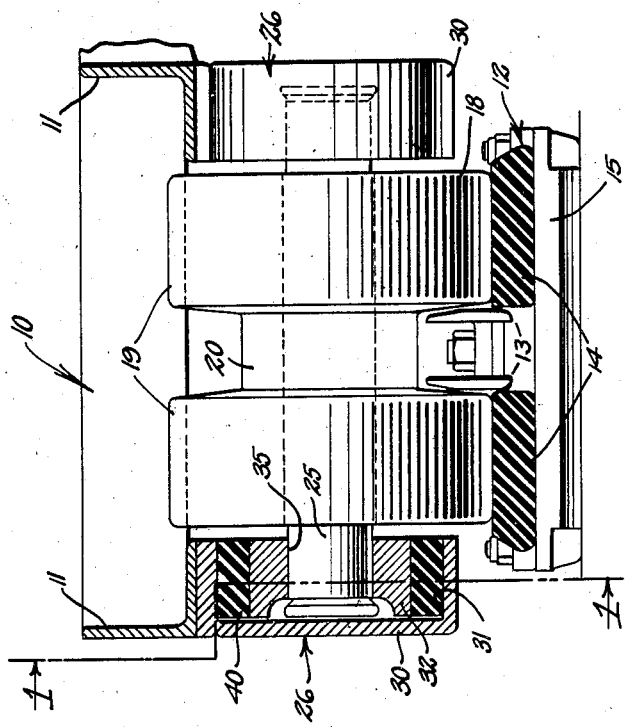
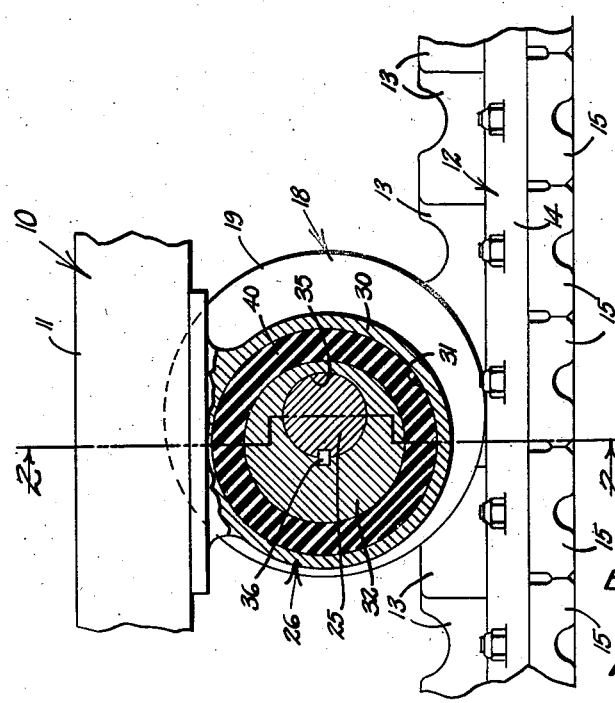
INVENTOR:
JAMES M. HAIT
BY
ATTORNEY Patented Jan. 22, 1946

2,393,369

UNITED STATES PATENT OFFICE 2,393,369

RESILIENT AXLE SUPPORT

James M. Hait, San Gabriel, Calif., assignor to Food Machinery Corporation, San Jose, Calif., a corporation of Delaware Application January 8, 1942, Serial No. 426,033

5 Claims. (Cl. 305—1)

This invention relates to resilient axle supports and particularly to a heavy duty axle support suitable for use on track-laying tractors and military tanks.

It is customary practice for military tanks to be provided on each side with a traction belt or chain, generically referred to hereinafter as a "belt," the weight of the tank being supported on bogie wheels which ride on the lower flights of these belts. When traveling at a sideward inclination and when turning, tremendous side thrust loads are developed and must be withstood by the mounting of the bogie wheels. Rigid mounting of the axles of the bogie wheels to meet this problem is not practical owing to the road shocks which must be absorbed by these bogie wheels when the tank is traveling at relatively high speeds as is the current practice.

It is therefore an object of the invention to provide a novel resilient axle support which will be suitable for absorbing excessive side thrust forces such as met with in the operation of military tanks.

The manner of accomplishing the foregoing object, as well as further objects and advantages, will be made manifest in the following description taken in connection with the accompanying drawing, in which:

Fig. 1 is a vertical sectional view taken on the line 1—1 of Fig. 2, showing a preferred embodiment of the invention in cross section.

Fig. 2 is a view taken on the line 2—2 of Fig. 1 and showing the invention in longitudinal section.

Referring specifically to the drawing, the invention as there illustrated is associated with a frame 10 of a tank, this frame including two longitudinal angle irons 11. This tank is also provided with traction belts 12 in accordance with the current practice. Each of these belts has a central row of guides 13, a pair of flexible tracks 14 and a series of grouser blocks 15 secured thereto. Adapted to roll on the tracks 14 is a series of bogie wheels 18 each wheel having a pair of rollers 19, one of which rides on each of the tracks 14, these rollers being connected by a neck 20. Each bogie wheel 18 freely rotates on an axle 25, opposite ends of which extend from the bogie wheel 18 and are supported on resilient axle supports 26 of my invention.

Each support 26 includes a cushion box 30 which has a cylindrical bore 31 and is rigidly fixed to one of the angle irons 11. Disposed within and uniformly spaced from the bore 31 is a cylindrical core member 32. The member 32 is preferably formed of metal and has a hole 35 formed eccentrically therein, this hole being adapted to receive an adjacent end of the axle 25 and providing a keyway so as to receive a key 36 which keys the axle to the core member.

Filling the space disposed radially outward from the core member 32, between this member and the cushion box 30, is an annular rubber cushion 40. This cushion is bonded to all of the surfaces of the bore 31 and of the core member 32 contacted thereby.

Disposed close to and just outside each of the bogie wheels 18 the resilient axle supports 26 of my invention effectively absorb excessive side thrust forces developed in the operation of the tank, this being taken up by contact of the axle ends with the cushion boxes 30.

These supports also take up road shocks by the resilient action of the annular cushions 40. Owing to the eccentricity of the hole 35 in the core member 32, road shocks tending to lift the wheels 18 relative to the frame 10 of the tank results not only in a compression of the rubber in the upper portion of the cushion 40, but produces a rotation of the core member 32 in the cushion box 30. Owing to the bonding of the cushion 40 to both the cushion box and the core member, this rotation produces a shearing stress between the inner and outer portions of the rubber annulus 40. For a given weight of rubber this permits a much greater vertical movement of the axles 25 than will be possible if this axle is placed in the middle of the core member 32.

The keying of each axle 25 to core members 32 at its opposite ends causes the entire bogie wheel mounted thereon to rise when one of the rollers 19 above is lifted. This results from rotation of the core member 32 adjacent the roller which is not being lifted (from beneath that is). This elevates that end of the axle due to the eccentricity of the bore in this core member in which that end of the axle is mounted. This is a great advantages as it keeps both rollers of each bogie wheel always aligned with the belt 12.

The term "rubber" as used herein and in the claims, is to be understood as including not only that material chemically known as rubber, but also all suitable equivalents therefor.

What I claim is:

1. In combination: a cushion box having a cushion chamber; a core member disposed within said chamber to form an annular space lying radially outward from said member within said chamber; and an annular cushion of soft rubber disposed in said space, said rubber filling said space and being bonded to substantially the entire surface of said box and said core member contacted thereby, there being a bore formed eccentrically in said core member to one side of the center thereof for receiving an axle.

2. A cushion support for a wheel axle comprising: a cushion box providing a ring; an annular elastic cushion within said ring; and an axle mounting member within said cushion, said cushion being bonded to said ring and said member, the latter having an axle mounting aperture disposed laterally of the ring center whereby the weight of the axle is supported by and imposes torque on said ring to resist and cushion movement of the axle.

3. A cushion support for a wheel axle comprising: a cushion box providing a ring; an annular elastic cushion within said ring; an axle mounting member within said cushion, said cushion being bonded to said ring and said member; and means for mounting said axle on said member with the axis of said axle disposed laterally of the ring center, and within the perimeter of said mounting member.

4. A cushioned support for a wheel axle comprising: a pair of spaced cushion boxes providing axially aligned substantially cylindrical chambers into which opposite ends of said axle extend; a pair of substantially cylindrical axle mounting members disposed within said chambers concentric therewith to provide annular spaces in said chambers surrounding said members, there being apertures eccentrically formed in said members for receiving the ends of said axle to support the latter laterally of the axis of said chambers; means for keying said axle to said members to prevent relative rotation between said axle and said members; and rings of resilient material filling said annular spaces, said rings being permanently bonded outwardly to the concave surface of said chambers and inwardly to the convex peripheries of said members, said axle being adapted to have a wheel freely rotatable thereon between said boxes.

5. A cushioned support for a wheel axle comprising: a pair of spaced cushion boxes providing axially aligned substantially cylindrical chambers into which opposite ends of said axle extend; a pair of substantially cylindrical axle mounting members disposed within said chamber concentric therewith to provide annular spaces in said chambers surrounding said members, there being apertures eccentrically formed in said members for receiving the ends of said axle to support the latter laterally of the axis of said chambers; means for keying said axle to said members to prevent relative rotation between said axle and said members; and rings of resilient material filling said annular spaces, said rings being permanently bonded outwardly to the concave surface of said chambers and inwardly to the convex peripheries of said members, said axle being adapted to have a wheel freely rotatable thereon between said boxes, said boxes being disposed close to opposite ends of said axle to form end limit stops for said axle which limit end play of the axle under excessive side loads.

JAMES M. HAIT.